United States Patent [19]

Dohnomoto et al.

[11] Patent Number: 4,590,132

[45] Date of Patent: May 20, 1986

[54] COMPOSITE MATERIAL REINFORCED WITH ALUMINA-SILICA FIBERS INCLUDING MULLITE CRYSTALLINE FORM

[75] Inventors: Tadashi Dohnomoto; Masahiro Kubo, both of Toyota; Haruo Kito, Aichi, all of Japan

[73] Assignees: Toyota Jidosha Kabushiki Kaisha, Toyota; Isolite Babcock Refractories Co., Ltd., Hoi, both of Japan

[21] Appl. No.: 726,358

[22] Filed: Apr. 23, 1985

[30] Foreign Application Priority Data

Oct. 25, 1984 [JP] Japan ................................ 59-225011

[51] Int. Cl.[4] ............................ B32B 5/02; B32B 9/00

[52] U.S. Cl. .................................... 428/614; 428/610; 428/608

[58] Field of Search ......................... 428/614, 610, 608

[56] References Cited

U.S. PATENT DOCUMENTS 4,457,979 7/1984 Donomoto et al. ................ 428/614
4,515,866 5/1985 Okamoto et al. ................... 428/614

FOREIGN PATENT DOCUMENTS 56-23242 3/1981 Japan .................................... 428/614

*Primary Examiner*—Veronica O'Keefe
*Attorney, Agent, or Firm*—Oblon, Fisher, Spivak, McClelland & Maier

[57] ABSTRACT

This composite material includes reinforcing alumina-silica fiber material in a metal matrix. The alumina-silica reinforcing fibers have principal components about 35% to about 65% by weight of $SiO_2$, about 35% to about 65% by weight of $Al_2O_3$, and a content of other substances of less than or equal to about 10% by weight, with the weight percentage of the mullite crystalline form therein being at least about 15%, and with the weight percentage of included non fibrous particles with diameter greater than or equal to 150 microns being not more than about 5%. And the matrix metal is selected from the group consisting of aluminum, magnesium, copper, zinc, lead, tin, and alloys having these as principal components. The volume proportion of the alumina-silica fibers should be at least 0.5%. Within these constraints, the qualities of the composite material with regard to wear, and wear on a mating member, and hardness, bending strength, and tensile strength, are good.

11 Claims, 14 Drawing Figures

COMPOSITE MATERIAL REINFORCED WITH ALUMINA-SILICA FIBERS INCLUDING MULLITE CRYSTALLINE FORM

BACKGROUND OF THE INVENTION

The present invention relates to a type of composite material which includes fiber material as reinforcing material embedded in a mass of matrix metal, and more particularly relates to such a type of composite material in which the reinforcing material is an alumina-silica fiber material including a significant amount of the mullite crystalline form, and the matrix metal is aluminum, magnesium, copper, zinc, lead, tin, or an alloy having one or more of these as principal component or components.

In the prior art, relatively low melting point metals such as aluminum, magnesium, copper, zinc, lead, tin, or alloys having one or more of these as principal component or components have been very popular for use as materials for elements which are in sliding contact with mating members, because of their affinity for such mating members and their good frictional characteristics. However nowadays, along with increasing demands for higher mechanical performance, the conditions in which such materials are required to operate are becoming more and more harsh, and tribological problems such as excessive frictional wear and adhesion burning occur more and more often; in the extreme case, these problems can lead to seizure of a moving element. For instance, if a diesel engine with aluminum alloy pistons is run under extreme conditions, there may arise problems with regard to abnormal wear to the piston ring grooves on the piston, or with regard to burning of the piston and of the piston rings.

One effective means that has been adopted for overcoming these tribological problems has been to reinforce such a relatively low melting point metal or alloy by an admixture of reinforcing fibrous material made of some extremely hard material. Thus, various composite materials including fibrous materials of various kinds as reinforcing material have been proposed. The advantages of such fiber reinforced materials include improved lightness, improved strength, enhanced wear characteristics, improved resistance to heat and burning, and so on. In particular, such concepts are disclosed in Japanese Patent Laying Open Publications Nos. Sho 58-93948 (1983), Sho 58-93837 (1983), Sho 58-93841 (1983), and Sho 59-70736 (1984), of all of which Japanese patent applications the applicant was the same entity as the assignee of the present patent application, and none of which is it intended hereby to admit as prior art to the present application except insofar as otherwise obliged by law. Further, for the fiber reinforcing material, there have been proposed the following kinds of inorganic fiber materials: alumina fiber, alumina-silica fiber, silicon carbide fiber, silicon nitride fiber, carbon fiber, potassium titanate fiber, and mineral fibers; and for the matrix metal, aluminum alloy and various other alloys have been suggested. Such prior art composite materials are disclosed, for example, in the above cited Japanese Patent Laying Open Publications Nos. Sho 58-93837 (1983) and Sho 58-93841 (1983).

However, in the case of using alumina fibers as the reinforcing material for a composite material, the problem arises that these alumina fibers are very expensive, and hence high cost for the resulting composite material is inevitable. This cost problem, in fact is one of the biggest current obstacles to the practical application of certain composite materials for making many types of actual components. On the other hand, in contrast to the above mentioned alumina fibers, mineral fibers whose principal components are alumina and silica are very inexpensive, and have conventionally for example been used in quantity as heat insulation fibers, in which case they are used in the amorphous crystalline form; therefore, if such fibers could satisfactorily be used as reinforcing fiber material for a composite material, then the cost could be very much reduced. However, the hardness of alumina-silica fibers is substantially less than that of alumina fibers, so that it is easy for the wear resistance of such a composite material to fall short of the optimum. Further, with these types of fibers used as reinforcing fiber material, since alumina-silica fibers, and particularly alumina-silica fibers in the amorphous crystalline phase, are structurally unstable, the problem tends to arise, during manufacture of the composite material, either that the wettability of the reinforcing fibers with respect to the molten matrix metal is poor, or alternatively, when the reinforcing alumina-silica fibers are well wetted by the molten matrix metal, that a reaction between them tends to deteriorate said reinforcing fibers. This can in the worst case so deteriorate the strength of the resulting composite material that unacceptable weakness results. This problem particularly tends to occur when the metal used as the matrix metal is one which has a strong tendency to form oxides, such as for example magnesium alloy.

In this connection, hardness in a resulting composite material is also a very desirable characteristic, and in the case that the reinforcing fiber material is relatively expensive alumina fiber material the question arises as to what crystalline structure for the alumina fiber material is desirable. Alumina has various crystalline structure, and the hard crystalline structures include the delta phase, the gamma phase, and the alpha phase. Alumina fibers including these crystalline structures include "Saffil RF" (this is a trademark) alumina fibers made by ICI of the U.K., "Sumitomo" alumina fibers made by Sumitomo Kagaku KK, and "Fiber FP" (this is another trademark) alumina fibers made by Dupont of the U.S.A, which are about 100% alpha alumina. With the use of these types of reinforcing fibers the strength of the composite material becomes very good, but since these fibers are very hard, if a member made out of composite material including them as reinforcing material is in frictional rubbing contact with a mating member, then the wear amount on the mating member will be increased. On the other hand, a composite material in which the reinforcing fiber material is alumina fibers with a content of from 5% to 60% by weight of alpha alumina fibers, such as are discussed in the above cited Japanese Patent Laying Open Publication No. Sho 58-93841 (1983), has in itself superior wear resistance, and also has superior frictional characteristics with regard to wear on a mating member, but falls short in the matter of hardness.

SUMMARY OF THE INVENTION

The inventors of the present invention have considered in depth the above detailed problems with regard to the manufacture of composite materials, and particularly with regard to the use of alumina-silica fiber material as reinforcing material for a composite material, and as a result of various experimental researches (the results of some of which will be given later) have discovered that it is effective to provide heat treatment to amorphous alumina-silica fibers, so as to separate out at least a certain amount of the mullite crystalline form, and to use as reinforcing fibers for the composite material alumina-silica fibers containing at least this amount of the mullite crystalline form. Thus, if the amount of the mullite crystalline form in the reinforcing alumina-silica material in the composite material as a whole is kept within certain limits, a satisfactory composite material can be produced.

Accordingly, the present invention is based upon knowledge gained as a result of these experimental researches by the present inventors, and its primary object is to provide a composite material including reinforcing alumina-silica fibers embedded in matrix metal, which has the advantages detailed above with regard to the use of alumina-silica fibers as the reinforcing fiber material including good mechanical characteristics, while overcoming the above explained disadvantages.

It is a further object of the present invention to provide such a composite material including reinforcing alumina-silica fibers, which utilizes inexpensive materials.

It is a further object of the present invention to provide such a composite material including reinforcing alumina-silica fibers, which is inexpensive with regard to manufacturing cost.

It is a further object of the present invention to provide such a composite material including reinforcing alumina-silica fibers, which is light.

It is a further object of the present invention to provide such a composite material including reinforcing alumina-silica fibers, which has good mechanical strength.

It is yet a further object of the present invention to provide such a composite material including reinforcing alumina-silica fibers, which has high bending strength.

It is a yet further object of the present invention to provide such a composite material including reinforcing alumina-silica fibers, which has good resistance against heat and burning.

It is a further object of the present invention to provide such a composite material including reinforcing alumina-silica fibers, which has good machinability.

It is a yet further object of the present invention to provide such a composite material including reinforcing alumina-silica fibers, which does not cause undue wear on a tool by which it is machined.

It is a further object of the present invention to provide such a composite material including reinforcing alumina-silica fibers, which has good wear characteristics with regard to wear on a member made of the composite material itself during use.

It is a yet further object of the present invention to provide such a composite material including reinforcing alumina-silica fibers, which does not cause undue wear on, or scuffing of, a mating member against which a member made of said composite material is frictionally rubbed during use.

It is a yet further object of the present invention to provide such a composite material including reinforcing alumina-silica fibers, in the manufacture of which the fiber reinforcing material has good wettability with respect to the molten matrix metal.

It is a yet further object of the present invention to provide such a composite material including reinforcing alumina-silica fibers, in the manufacture of which, although as mentioned above the fiber reinforcing material has good wettability with respect to the molten matrix metal, no deleterious reaction therebetween substantially occurs.

According to the present invention, these and other objects are accomplished by a composite material comprising (a) reinforcing alumina-silica fiber material, with principal components being about 35% to about 65% by weight of $SiO_2$, about 35% to about 65% by weight of $Al_2O_3$, and a content of other substances of less than or equal to about 10% by weight, with the weight percentage of the mullite crystalline form therein being at least about 15%, and with the weight percentage of included non fibrous particles with diameter greater than or equal to 150 microns being not more than about 5%; and (b) a matrix metal selected from the group consisting of aluminum, magnesium, copper, zinc, lead, tin, and alloys having these as principal components; wherein (c) the volume proportion of said alumina-silica fibers is at least 0.5%.

According to such a composition according to the present invention, the matrix metal is reinforced with alumina-silica fibers including mullite crystal, which are enormously cheaper as compared to alumina fibers, and further are hard and stable, as a result of which an extremely inexpensive composite material having superior mechanical characteristics such as wear resistance and strength can be obtained, and also, since the amount of large hard non fibrous particles of diameter greater than or equal to 150 microns is restricted to a maximum of 5% by weight, a composite material with superior strength and machinability properties is obtained, and further such a type of composite material is obtained in which there is no danger of abnormal wear to mating parts because of particulate matter becoming detached from said composite material.

Generally, alumina-silica type fibers may be categorized into alumina fibers or alumina-silica fibers on the basis of their composition and their method of manufacture. So called alumina fibers, including at least 70% by weight of $Al_2O_3$ and not more than 30% by weight of $SiO_2$, are formed into fibers from a mixture of a viscous organic solution with an aluminum inorganic salt; they are formed in an oxidizing furnace at high temperature, so that they have superior qualities as reinforcing fibers, but are extremely expensive. On the other hand, so called alumina-silica fibers, which have about 35% to 65% by weight of $Al_2O_3$ and about 35% to 65% by weight of $SiO_2$, can be made relatively cheaply and in large quantity, since the melting point of a mixture of alumina and silica has lower melting point than alumina, so that a mixture of alumina and silica can be melted in for example an electric furnace, and the molten mixture can be formed into fibers by either the blowing method or the spinning method. Particularly, if the included amount of $Al_2O_3$ is 65% by weight or more, and the included amount of $SiO_2$ is 35% by weight or less, the melting point of the mixture of alumina and silica becomes too high, and the viscosity of the molten mixture is low; on the other hand, if the included amount of $Al_2O_3$ is 35% by weight or less, and the included amount of $SiO_2$ is 65% by weight or more, a viscosity suitable for blowing or spinning cannot be obtained, and for reasons such as these, these low cost methods of manufacture are difficult to apply in these cases. Additionally, in order to adjust the melting point or viscosity of the mixture, or to impart particular characteristics to the fibers, it is possible to add to the mixture of alumina and silica such metal oxides as CaO, MgO, $Na_2O$, $Fe_2O_3$, $Cr_2O_3$, $ZrO_2$, $TiO_2$, PbO, $SnO_2$, ZnO, $MoO_3$, NiO, $K_2O$, $MnO_2$, $B_2O_3$, $V_2O_5$, CuO, $Co_3O_4$, and so forth. According to the results of experimental researches carried out by the inventors of the present invention, it has been confirmed that it is preferable to restrict such constituents to not more than 10% by weight. Therefore, the composition of the alumina-silica fibers used for the reinforcing fibers in the composite material of the present invention has been determined as being required to be from 35% to 65% by weight $Al_2O_3$, from 35% to 65% by weight $SiO_2$, and from 0% to 10% by weight of other components.

The alumina-silica fibers manufactured by the blowing method or the spinning method are amorphous fibers, and these fibers have a hardness value of about Hv 700. If alumina-silica fibers in this amorphous state are heated to 950° C. or more, mullite crystals are formed, and the hardness of the fibers is increased. According to the results of experimental research carried out by the inventors of the present invention, it has been confirmed that when the amount of the mullite crystalline form included reaches about 15% by weight there is a sudden increase in the hardness of the fibers, and when the mullite crystalline form reaches 19% by weight the hardness of the fibers reaches around Hv 1000, and further it has been ascertained that that there are no very great corresponding increases in the hardness of the fibers along with increases in the amount of the mullite crystalline form beyond this value of 19%. The wear resistance and strength of a metal reinforced with alumina-silica fibers including the mullite crystalline form shows a good correspondence to the hardness of the alumina-silica fibers themselves, and, when the amount of mullite crystalline form included is at least 15% by weight, and particularly when it is at least 19% by weight, a composite material of superior wear resistance and strength can be obtained. Therefore, in the composite material of the present invention, the amount of the mullite crystalline form in the alumina-silica fibers is required to be at least 15% by weight, and preferably is desired to be at least 19% by weight.

Moreover, in the manufacture of alumina-silica fibers by the blowing method or the like, along with the fibers, a large quantity of non fibrous particles are also inevitably produced, and therefore a collection of alumina-silica fibers will inevitably contain a relatively large amount of particles of non fibrous material. When heat treatment is applied to improve the characteristics of the alumina-silica fibers by producing the mullite crystalline form as detailed above, the non fibrous particles will also undergo production of the mullite crystalline form in them, and themselves will also be hardened along with the hardening of the alumina-silica fibers. According to the results of experimental research carried out by the inventors of the present invention, particularly the very large non fibrous particles having a particle diameter greater than or equal to 150 microns, if left in the composite material produced, impair the mechanical properties of said composite material, and are a source of lowered strength for the composite material, and moreover tend to produce problems such as abnormal wear in a mating element which is frictionally cooperating with a member made of said composite material, due to these large and hard particles becoming detached from the composite material. Therefore, in the composite material of the present invention, the amount of non fibrous particles of particle diameter greater than or equal to 150 microns included in the collection of alumina-silica fibers used as reinforcing material is required to be limited to a maximum of 5% by weight, and preferably further is desired to be limited to not more than 2% by weight, and even more preferably is desired to be limited to not more than 1% by weight.

According to the results of further experimental researches carried out by the inventors of the present invention, a composite material in which reinforcing fibers are alumina-silica fibers including the mullite crystalline form has the above superior characteristics, and, when the matrix metal is aluminum, magnesium, copper, zinc, lead, tin, or an alloy having these as principal components, even if the volume proportion of alumina-silica fibers is around 0.5%, there is a remarkable increase in the wear resistance of the composite material, and, even if the volume proportion of the alumina-silica fibers is increased, there is not an enormous increase in the wear on a mating element which is frictionally cooperating with a member made of said composite material. Therefore, in the composite material of the present invention, the volume proportion of alumina-silica fibers is required to be at least 0.5%, and preferably is desired to be not less than 1%, and even more preferably is desired to be not less than 2%.

In order to obtain a composite material with superior mechanical characteristics, and moreover with superior friction wear characteristics with respect to wear on a mating element, the alumina-silica fibers including the mullite crystalline form should, according to the results of the experimental researches carried out by the inventors of the present invention, preferably have in the case of short fibers an average fiber diameter of approximately 1.5 to 5.0 microns and a fiber length of 20 microns to 3 millimeters, and in the case of long fibers an average fiber diameter of approximately 3 to 30 microns.

BRIEF DESCRIPTION OF THE DRAWINGS

The present invention will now be described in terms of several preferred embodiments thereof, and with reference to the appended drawings. However, it should be understood that the description of the embodiments, and the drawings, are not any of them intended to be limitative of the scope of the present invention, since this scope is intended to be understood as to be defined by the appended claims, in their legitimate and proper interpretation. In the drawings, like reference symbols denote like parts and dimensions and so on in the separate figures thereof; spatial terms are to be understood as referring only to the orientation on the drawing paper of the relevant figure and not to any actual orientation of an embodiment, unless otherwise qualified; in the description, all percentages are to be understood as being by weight unless otherwise indicated; and:

DESCRIPTION OF THE PREFERRED EMBODIMENTS

The present invention will now be described with reference to the preferred embodiments thereof, and with reference to the appended drawings.

TESTS RELATING TO THE FIRST PREFERRED EMBODIMENT VARIATION OF MULLITE CRYSTALLINE FORM AMOUNT

A quantity of alumina-silica fiber material of the type manufactured by Isolite Babcock Refractories K.K Company, with trade name "Kaowool", having a nominal composition of 51% $Al_2O_3$ and 49% $SiO_2$, with a quantity of non fibrous material intermingled therewith, was subjected to per se known particle elimination processing such as filtration or the like, so that the non fibrous particles were largely eliminated, and so that the included weight of non fibrous particles with a diameter greater than or equal to 150 microns was about 0.4%. Next, various samples of these alumina-silica fibers were subjected to heat processing at a variety of high temperatures, so as to form six quantities of alumina-silica fibers designated as A0 through A5 with various amounts of the mullite crystalline form included therein, with parameters as detailed in Table I, which is given at the end of this specification and before the claims thereof. As will be understood from this Table I, the six quantities of alumina-silica fibers A0 through A5 had widely differing weight percentages of the mullite crystalline form included in them, but their other parameters, i.e. their chemical composition, the amount in weight percent of non fibrous particles of diameter greater than or equal to 150 microns included in them, their average fiber diameter, and their average fiber length, were substantially the same, for all the fiber quantities A0 through A5.

Figure 1:
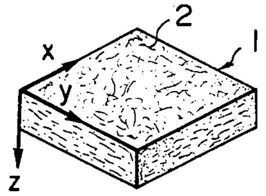
FIG. 1 is a perspective view showing a preform made of reinforcing fibers stuck together with a binder, said preform being generally cuboidal, and particularly indicating the non isotropic orientation of said reinforcing fibers.

Next, from each of these quantities of alumina-silica fibers A0 thruogh A5 there was formed a corresponding preform, also designated by the reference symbol A0 through A5 since no confusion will arise from this, in the following way. First, the alumina-silica fibers with compositions as per Table I and the non fibrous particles intermingled in them were dispersed in colloidal silica, which acted as a binder: the mixture was then well stirred up so that the alumina-silica fibers and the non fibrous particles were evenly dispersed therein, and then the preform was formed by vacuum forming from the mixture, said preform having dimensions of 80 by 80 by 20 millimeters, as shown in perspective view in FIG. 1. As suggested in FIG. 1, the orientation of the alumina-silica fibers 2 in these preforms was not isotropic in three dimensions: in fact, the alumina-silica fibers 2 were largely oriented parallel to the longer sides of the cuboidal preform, i.e. in the x-y plane as shown in FIG. 1, and were substantially randomly oriented in this plane; but the fibers 2 did not extend very substantially in the z direction as seen in FIG. 1, and were, so to speak, somewhat stacked on one another with regard to this direction. Finally, the preform was fired in a furnace at about 600° C., so that the silica bonded together the individual alumina-silica fibers 2, acting as a binder. The fiber volume proportions for each of the six preforms A0 through A5 are also shown in Table I.

Figure 3:
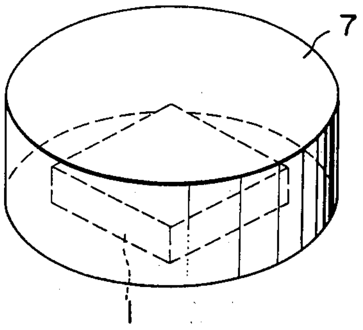
FIG. 3 is a perspective view of a solidified cast lump of matrix metal with said preform of FIG. 1 shown by phantom lines in its interior, as removed from the FIG. 2 apparatus after having been cast therein.
Figure 2:
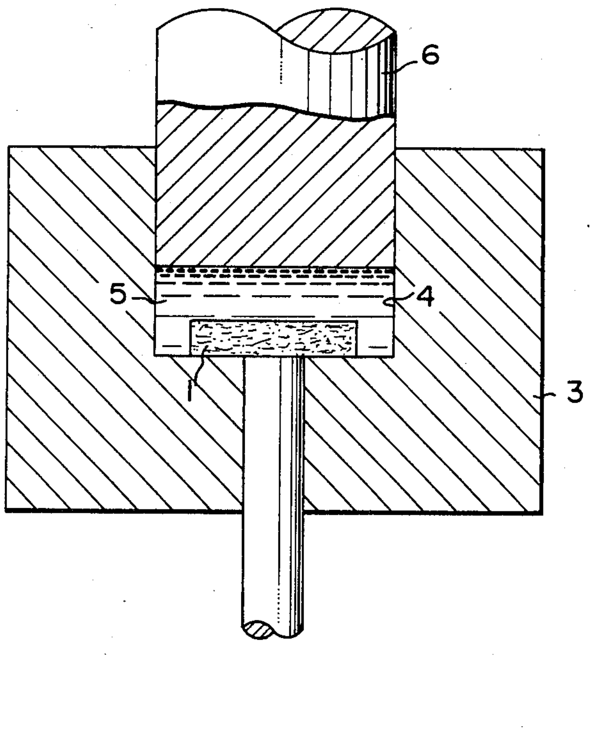
FIG. 2 is a schematic sectional diagram showing a mold with a mold cavity, and a pressure piston which is being forced into said mold cavity in order to pressurize molten matrix metal around the preform of FIG. 1 which is being received in said mold cavity, during a casting stage of a process of manufacture of the composite material of the present invention.

Next, a casting process was performed on each of the preforms A0 through A5, as schematically shown in section in FIG. 2. Each of the preforms 1 was placed into the mold cavity 4 of a casting mold 3, and then a quantity of molten metal for serving as the matrix metal for the resultant composite material, in the case of this first preferred embodiment being molten aluminum alloy of type JIS (Japan Industrial Standard) AC8A and being heated to about 730° C., was poured into the mold cavity 4 over and around the preform 1. Then a piston 6, which closely cooperated with the defining surface of the mold cavity 4, was forced into said mold cavity 4 and was forced inwards, so as to pressurize the molten matrix metal to a pressure of about 1500 kg/cm$^2$ and thus to force it into the interstices between the fibers 2 of the preform 1. This pressure was maintained until the mass 5 of matrix metal was completely solidified, and then the resultant cast form 7, schematically shown in FIG. 3, was removed from the mold cavity 4. This cast form 7 was cylindrical, with diameter about 110 millimeters and height about 50 millimeters. Finally, heat treatment of type T7 was applied to this cast form 7, and from the part of it (shown by phantom lines in FIG. 3) in which the fiber preform 1 was embedded was cut a test piece of composite material incorporating alumina-silica fibers as the reinforcing fiber material and aluminum alloy as the matrix metal, of dimensions correspondingly again about 80 by 80 by 20 millimeters; thus, in all, six such test pieces were manufactured, each corresponding to one of the preforms A0 through A5 made of one of the alumina-silica fiber collections of Table I. As will be understood from the following, this set of test pieces included one or more preferred embodiments of the present invention and one or more comparison samples which were not embodiments of the present invention. From each of these test pieces were machined a hardness test sample, a wear test block sample, and a bending strength test sample, each of which will be hereinafter referred to by the reference symbol A0 through A5 of its parent preform since no confusion will arise therefrom.

First, with respect to the hardness test samples, after the test surfaces of the hardness test samples had been machined, the Vickers hardness of the alumina-silica fibers included in said samples was measured. Since, however, the size of the reinforcing fibers was extremely small, the average fiber diameter being about 2.9 microns as specified above, the hardness was measured for non fibrous particles of relatively large diameter greater than or equal to 150 microns in order to make hardness measurement possible, and the hardness of the alumina-silica fibers was taken from that measurement. The results of these tests are shown in FIG. 4, which is a graph in which the mullite crystalline form content as a weight percentaqge of the alumina-silica fibers included in said test samples is shown along the horizontal axis and the Vickers hardness of the alumina-silica fibers included in said samples is shown along the vertical axis.

Figure 4:
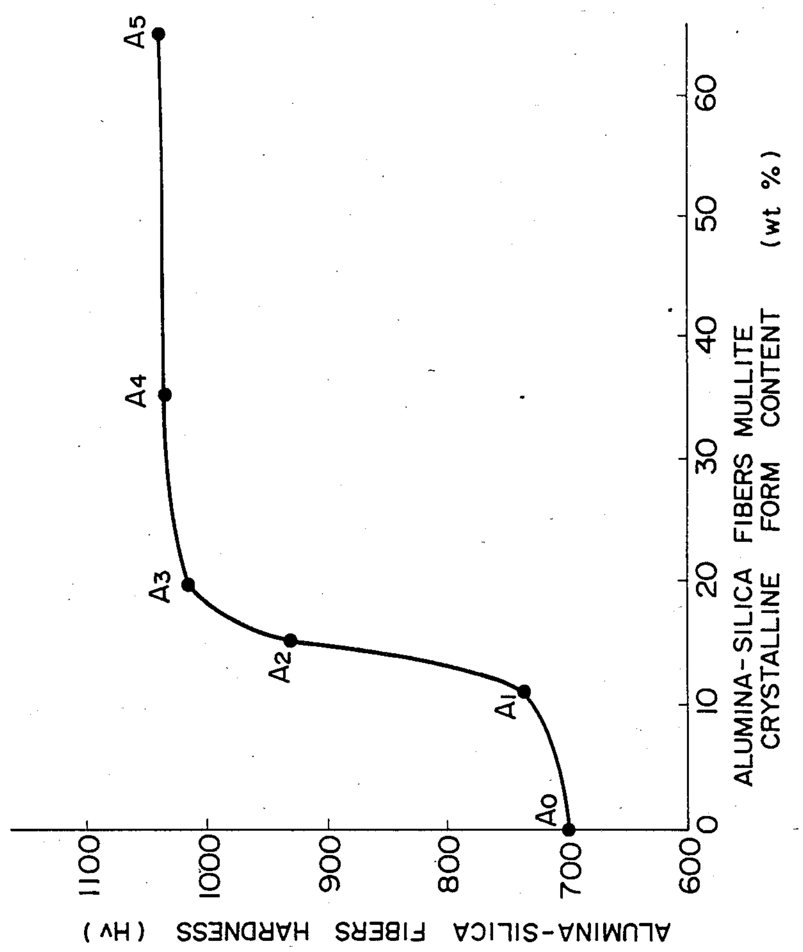
FIG. 4 is a graph, in which the mullite crystalline form content as a weight percentage of the alumina silica fibers included in test samples A0 through A5 is shown along the horizontal axis, and the Vickers hardness of said alumina-silica fibers included in said samples is shown along the vertical axis.

From the results of these tests as shown in FIG. 4, it will be understood that the hardness of the alumina-silica fibers included in the samples is low up to about 10% weight content of the mullite crystalline form therein, and then sharply increases along with further increase in the percentage weight content in the alumina-silica fibers of the mullite crystalline form, and subsequently levels off and is substantially constant when the percentage weight content of the mullite crystalline form reaches about 20% or more.

Next, with regard to the wear test samples, in turn, each of these test samples A0 through A5 was mounted in a LFW friction wear test machine, and its test surface was brought into contact with the outer cylindrical surface of a mating element, which was a cylinder of bearing steel of type JIS (Japanese Industrial Standard) SUJ2, with hardness Hv equal to about 630. While supplying lubricating oil (Castle Motor Oil (a trademark) 5W-30) at a temperature of 20° C. to the contacting surfaces of the test pieces, in each case a friction wear test was carried out by rotating the cylindrical mating element for one hour, using a contact pressure of 20 kg/mm$^2$ and a sliding speed of 0.3 meters per second.

Figure 5:
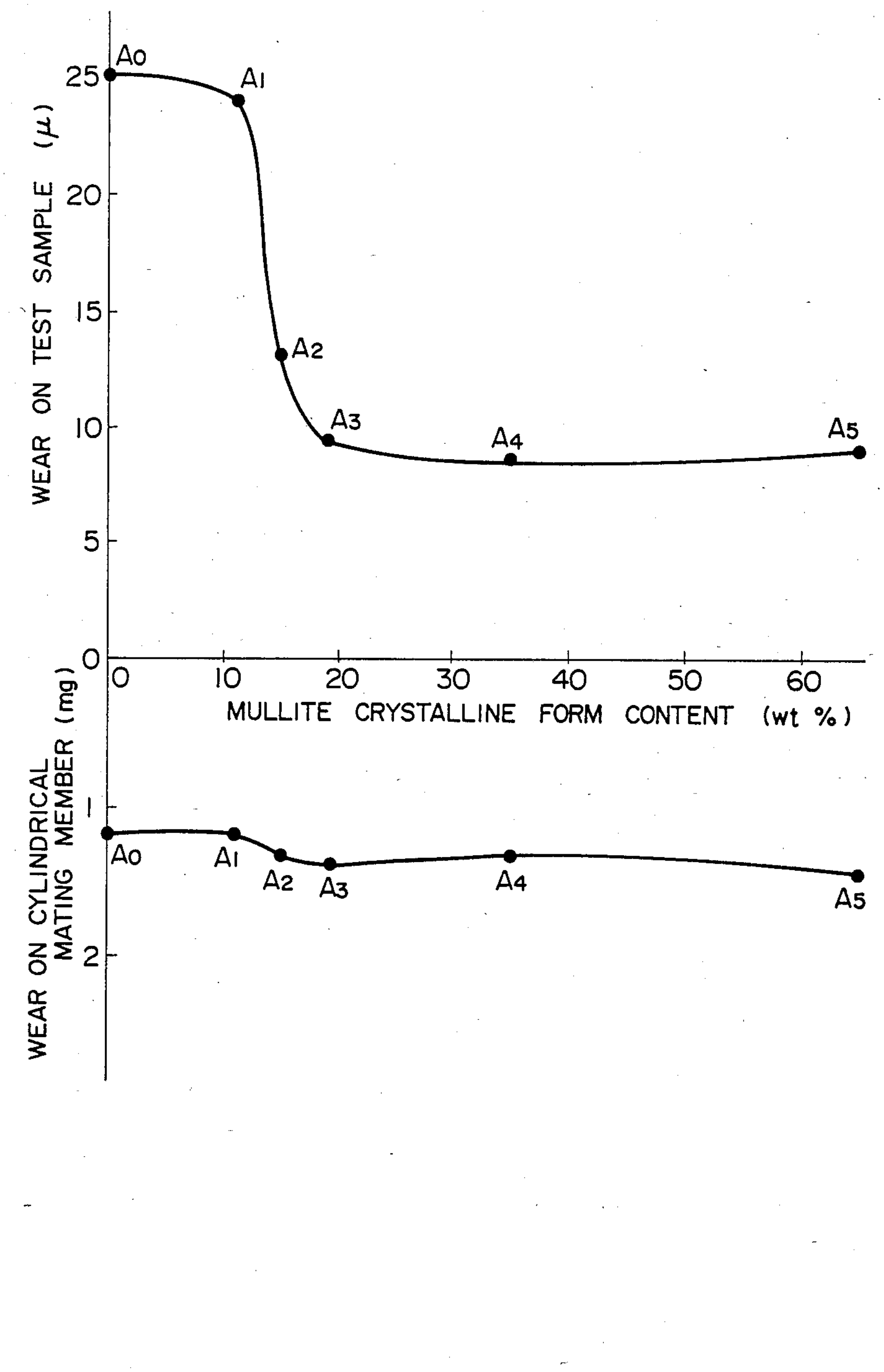
FIG. 5 is a graph in which, for each of said six test samples A0 through A5, during a wear test in which the mating member was a bearing steel cylinder, the upper half shows along the vertical axis the amount of wear on the actual test sample of composite material in microns, and the lower half shows along the vertical axis the amount of wear on said bearing steel mating member in milligrams, while the weight proportion in percent of the mullite crystalline form included in the alumina-silica fibers incorporated in said test samples is shown along the horizontal axis.

The results of these friction wear tests are shown in FIG. 5. In this figure, which is a two sided graph, for each of the wear test samples A0 through A5, the upper half shows along the vertical axis the amount of wear on the actual test sample of composite material in microns, and the lower half shows along the vertical axis the amount of wear on the mating member (i.e., the bearing steel cylinder) in milligrams. And the weight proportion in percent of the mullite crystalline form included in the alumina-silica fibers incorporated in said test samples is shown along the horizontal axis.

Now, from this FIG. 5 it will be understood that, when the weight proportion of the mullite crystalline form included in the alumina-silica fibers was in the range from 0% to about 11%, then the wear amount of the test piece was relatively high, and did not change substantially with increase in the weight proportion of the mullite crystalline form; but as the weight proportion of the mullite crystalline form included in the alumina-silica fibers rose from about 11% to about 19% the amount of wear on the test piece dropped very sharply. However, when the weight proportion of the mullite crystalline form included in the alumina-silica fibers was 19% or more, then the wear amount of the test piece remained substantially constant along with further increase of the weight proportion of the mullite crystalline form. On the other hand, the wear amount of the mating member (the bearing steel cylinder) was substantially independent of the weight proportion of the mullite crystalline form included in the alumina-silica fibers.

Figure 6:
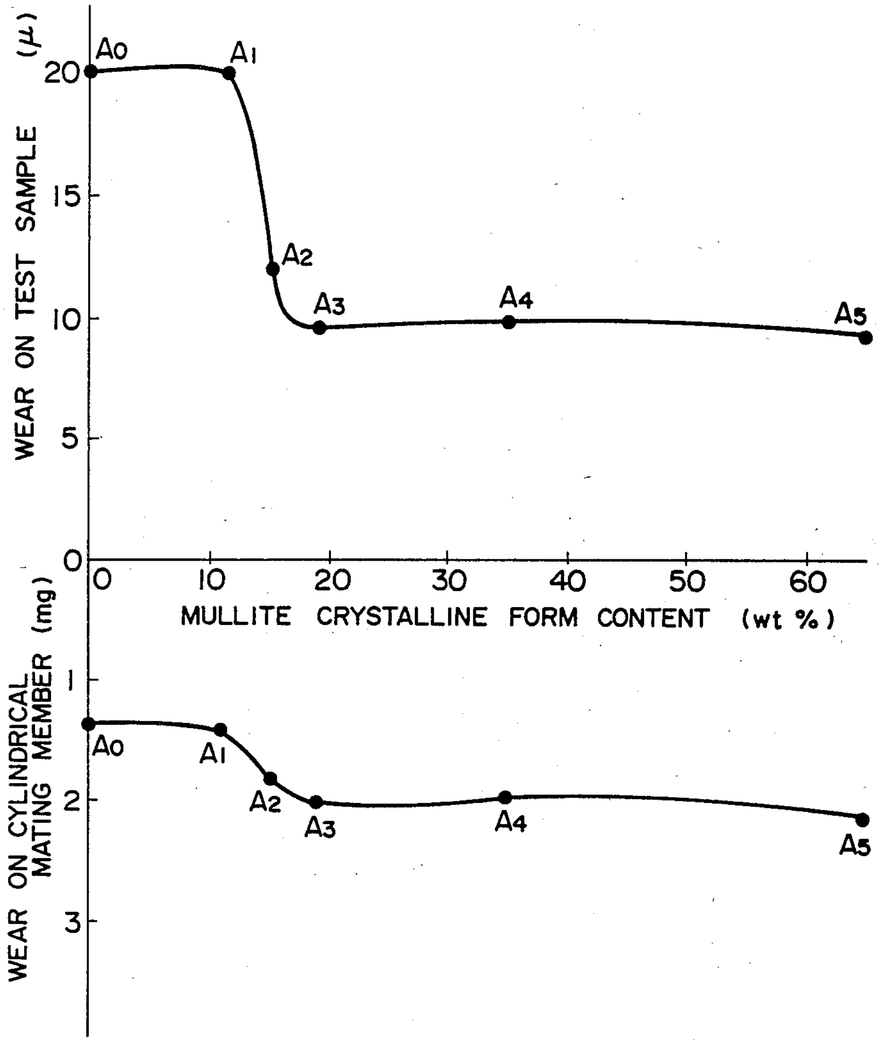
FIG. 6 is similar to FIG. 5, and is a graph in which, for each of said six test samples A0 through A5, during another wear test in which the mating member was a spheroidal graphite cast iron cylinder, the upper half shows along the vertical axis the amount of wear on the actual test sample of composite material in microns, and the lower half shows along the vertical axis the amount of wear on said spheroidal graphite cast iron mating member in milligrams, while the weight proportion in percent of the mullite crystalline form included in the alumina-silica fibers incorporated is said test samples is shown along the horizontal axis.

Further, similar wear tests were also carried out using a mating member which was a cylindrical piece of spheroidal graphite cast iron of type JIS (Japanese Industrial Standard) FCD70. It should be noted that, in these wear tests, the test sample was so oriented that the face thereof undergoing friction testing was perpendicular to the x-y plane shown in FIG. 1. The results of these friction wear tests are shown in FIG. 6. In this figure which is a two sided graph similar to the graph of FIG. 5, for each of the wear test samples A0 through A5, the upper half shows along the vertical axis the amount of wear on the actual test sample of composite material in microns, and the lower half shows along the vertical axis the amount of wear on the mating member (i.e., the spheroidal graphite cast iron cylinder) in milligrams. And the weight proportion in percent of the mullite crystalline form included in the alumina-silica fibers incorporated in said test samples is shown along the horizontal axis. Now, from this FIG. 6 it will be understood that the same tendencies are observed with respect to wear on the test sample in the case that the mating member is made of spheroidal graphite cast iron, as when it is made of bearing steel: when the weight proportion of the mullite crystalline form included in the alumina-silica fibers was in the range from 0% to about 11%, then the wear amount of the test sample piece was relatively high, and did not change substantially with increase in the weight proportion of the mullite crystalline form; but as the weight proportion of the mullite crystalline form included in the alumina-silica fibers rose from about 11% to about 19% the amount of wear on the test sample dropped very sharply. However, when the weight proportion of the mullite crystalline form included in the alumina-silica fibers was 19% or more, then the wear amount of the test sample piece remained substantially constant along with further increase of the weight proportion of the mullite crystalline form. On the other hand, the tendencies with regard to the wear amount of the mating member (the spheroidal graphite cast iron cylinder) were not quite the same: this wear amount slightly but significant increased, as the weight proportion of the mullite crystalline form included in the alumina-silica fibers rose from about 11% to about 19%, and outside this range said wear amount of said mating cast iron cylinder member was again substantially independent of the weight proportion of the mullite crystalline form included in the alumina-silica fibers.

This relationship between the weight proportion of the mullite crystalline form included in the alumina-silica fibers included as reinforcing fiber material in the test sample piece, and the wear resistance of said test sample piece, substantially agrees with the tendencies shown in FIG. 4 and described above with respect to the Vickers hardness of these alumina-silica fibers. Accordingly, from these test results, it is considered that, from the point of view of wear on a part or finished member made of the composite material according to the present invention and also from the point of view of wear on a mating member which is sliding frictionally thereagainst, and further from the point of view of the beneficial results of maximizing the hardness of the reinforcing fibers, it is desirable that the weight proportion of the mullite crystalline form included in the alumina-silica fiber material incorporated as fibrous reinforcing material for the composite material according to this invention should be greater than or equal to about 15%, and preferably should be greater than or equal to about 19%.

Next, with regard to the bending strength test samples, each of these test samples A0 through A5 had a length of about 50 millimeters, a width of about 10 millimeters, and a thickness of about 2 millimeters, and had its 50 by 10 millimeter plane parallel to the x-y plane as indicated in FIG. 1 and thus with most of the reinforcing fibers lying parallel to it. For each of these test pieces A0 through A5, three point bending tests were carried out, both at an operating temperature of about 250° C. and also at room or ambient temperature, with the gap between the support points set to 39 millimeters. In these bending strength tests, the bending strength of the composite material sample was measured as the surface stress at breaking point M/Z, where M was the bending moment at the breaking point, and Z was the cross sectional coefficient of the test sample.

Figure 7:
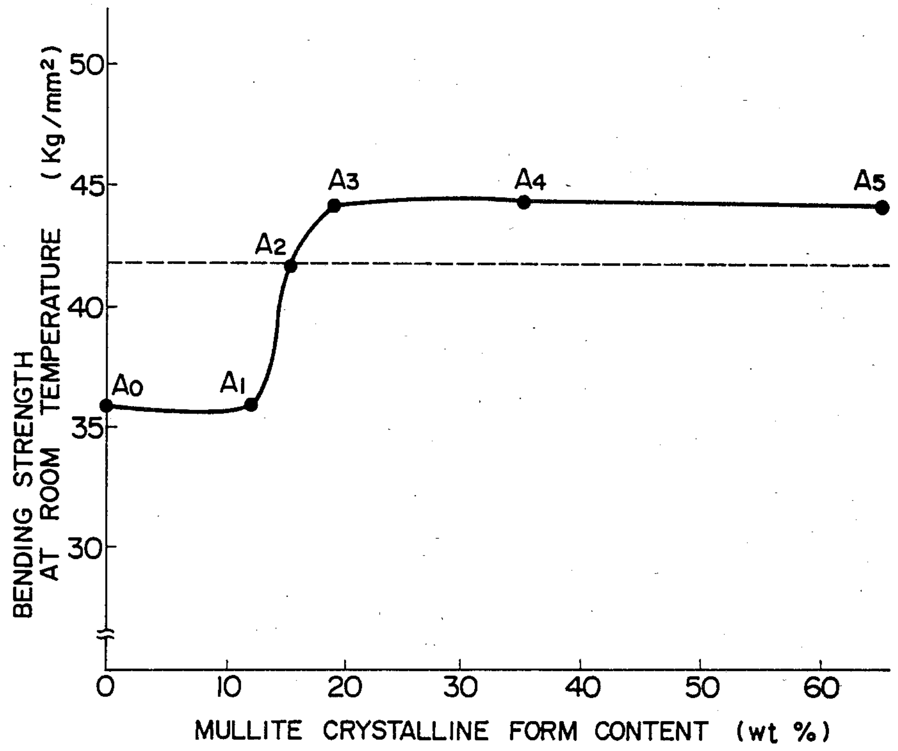
FIG. 7 is a graph, which relates to test results at room temperature, showing bending strength for each of said six test samples A0 through A5, with the weight proportion in percent of the mullite crystalline form included in the alumina-silica fibers incorporated in said test sample being shown along the horizontal axis, and with the corresponding bending strength in kg/mm$^2$ being shown along the vertical axis, further with the dashed line indicating the bending strength of the matrix metal, which in this case is T7 heat treated aluminum alloy of JIS (Japanese Industrial Standard) AC8A.
Figure 8:
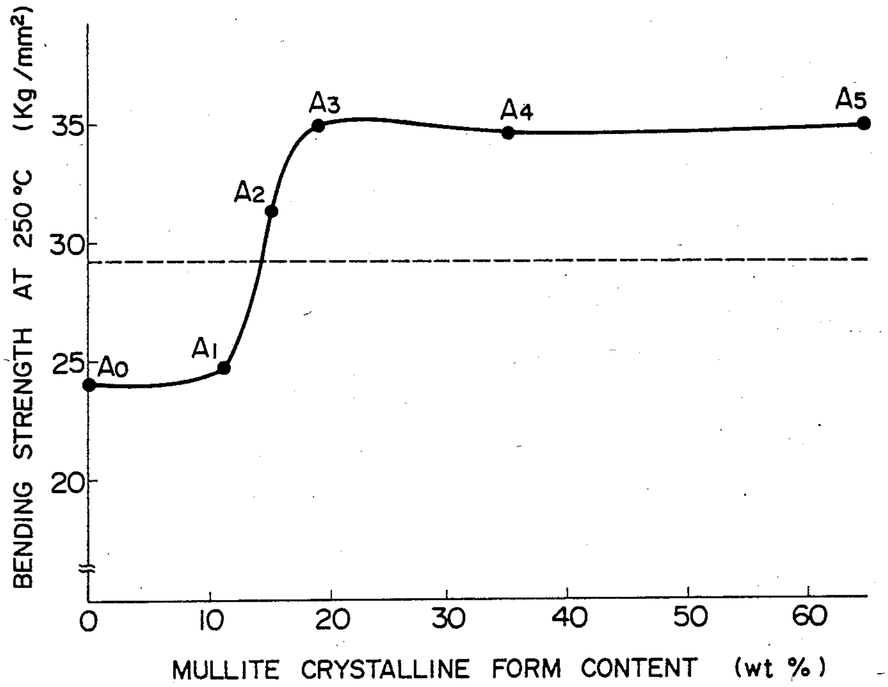
FIG. 8 is a similar graph to the graph of FIG. 7, and relates to test results at the temperature of 250° C., showing bending strength for each of said six test samples A0 through A5, again with the weight proportion in percent of the mullite crystalline form included in the alumina-silica fibers incorporated in said test samples being shown along the horizontal axis, and with the corresponding bending strength in kg/mm$^2$ being shown along the vertical axis, with again the dashed line indicating the bending strength of the T7 heat treated JIS AC8A aluminum alloy matrix metal in this case.

The results of these bending strength tests are shown in FIGS. 7 and 8. In FIG. 7, which relates to the test results at room temperature, there is given by the solid line a graph showing bending strength for each of the six test samples A0 through A5, with the weight proportion is percent of the mullite crystalline form included in the alumina-silica fibers incorporated in said test samples being shown along the horizontal axis, and with the corresponding bending strength in $kg/mm^2$ being shown along the vertical axis; and the dashed line shows the corresponding bending strength for pure aluminum alloy (JIS AC8A) without any reinforcing fibers which has been subjected to T7 heat treatment, which is the matrix metal in this case. And in FIG. 8 there is given a similar group which relates to the test results at the temperature of 250° C., again with the weight proportion in percent of the mullite crystalline form included in the alumina-silica fibers incorporated in said test samples being shown along the horizontal axis, with the corresponding bending strength in $kg/mm^2$ being shown along the vertical axis, and with the dashed line showing the corresponding bending strength for the pure T7 heat treated aluminum alloy (JIS AC8A) which is the matrix metal in this case.

From these graphs in FIGS. 7 and 8, which exhibit substantially the same tendency, it will be apparent that, when the weight proportion of the mullite crystalline form included in the alumina-silica fibers was in the range from 0% to about 11%, then the bending strength of the test sample piece was relatively low, and did not change substantially with increase in the weight proportion of the mullite crystalline form; but, as the weight proportion of the mullite crystalline form included in the alumina-silica fibers rose from about 11% to about 19%, and particularly as said weight proportion rose above 15%, at which point the bending strength of the test sample became about equal to the bending strength of a piece of the T7 heat treated JIS AC8A aluminum alloy matrix metal without any admixture of reinforcing fibers, the bending strength of the test samples rose very sharply. However, when the weight proportion of the mullite crystalline form included in the alumina-silica fibers was 19% or more, then the bending strength of the test sample pieces remained substantially constant along with further increase of the weight proportion of the mullite crystalline form. Accordingly, from these test results, it is considered that, from the point of view of bending strength of a part or finished member made of the composite material according to the present invention, it is desirable that the weight proportion of the mullite crystalline form included in the alumina-silica fiber material incorporated as fibrous reinforcing material for the composite material according to this invention should be grater than or equal to about 15%, and in particular, in order to ensure substantially optimum such bending strength, said weight proportion preferably should be greater than or equal to about 19%. It is considered that the reason why the bending strength of the composite material test pieces was lower than the bending strength of the heat treated JIS AC8A aluminum alloy matrix metal without any admixture of reinforcing fibers, in the case of tests performed at room temperature when the weight proportion of the mullite crystalline form included in the alumina-silica fiber material incorporated as fibrous reinforcing material for the composite material according to this invention was less than about 15%, and in the case of tests performed at a temperature of 250° C. when the weight proportion of the mullite crystalline form included in the alumina-silica fiber material incorporated as fibrous reinforcing material for the composite material according to this invention was less than about 14%, is that when the content of the mullite crystalline form was relatively low a chemical reaction occurred between the alumina-silica fibers and the aluminum alloy, which is believed to have caused the fibers to be reacted.

TESTS RELATING TO THE SECOND PREFERRED EMBODIMENT VARIATION OF CHEMICAL COMPOSITION

Next, three quantities of alumina-silica fiber material of the three types disclosed in Table II, which is given at the end of this specification and before the claims thereof, denoted as "B", "C", and "D", which differed with regard to their chemical composition, were subjected to per se known particle elimination processing such as filtration or the like, so that the non fibrous particles initially intermingled with them were largely eliminated, and so that the included weight of non fibrous particles with a diameter greater than or equal to 150 microns was about 0.15%. Next, two samples of each of these three types of alumina-silica fibers were subjected to heat processing at a variety of high temperatures, so as to form six quantities of alumina-silica fibers designated as B0, B1, C0, C1, D0, and D1 with varying amounts of the mullite crystalline form included therein, with parameters as detailed in Table II at the end of this specification and before the claims thereof. As will be understood from this Table II, the six quantities of alumina-silica fibers B0, B1, C0, C1, D0, and D1 had widely differing weight percentages of the mullite crystalline form included in them, and had chemical compositions in pairs; and their other parameters, i.e. the amount in weight percent of non fibrous particles of diameter greater than or equal to 150 microns included in them, their average fiber diameter, and their average fiber length, also went substantially in pairs, i.e. were the same for the two fiber quantities B0 and B1, and for the two fiber quantities C0 and C1, and for the two fiber quantities D0 and D1, but differed between these sets.

Next, from each of these six quantities of alumina-silica fibers B0, B1, C0, C1, D0, and D1, there was formed a corresponding preform, also designated by the like reference symbol B0, B1, C0, C1, D0, and D1 since no confusion will arise thereby, by the vacuum forming method, in substantially the same way as described above with regard to the first preferred embodiment, said preform having dimensions of 80 by 80 by 20 millimeters, and as before the preforms were fired in a furnace at about 600° C. The fiber volume proportions for each of the six finished preforms B0, B1, C0, C1, D0, and D1 are also shown in Table II.

Next, a high pressure casting process was performed on each of the preforms B0, B1, C0, C1, D0, and D1, in substantially the same way as in the case described above of the first preferred embodiment, using aluminum alloy of type JIS (Japanese Industrial Standard) AC8A as the matrix metal, said matrix metal being cast at a temperature of about 730° C. and at a pressure of about 1500 $kg/cm^2$ around and into the interstices of the preforms; and heat treatment of type T7 was applied to the cast forms, and from the parts of them in which the fiber preforms were embedded were cut six test pieces of composite material incorporating alumina—silica fibers as the reinforcing material and aluminum alloy as the matrix metal; thus, in all, again, six such test pieces were manufactured, each respectively corresponding to one of the preforms B0, B1, C0, C1, D0, and D1 made of one of the alumina—silica fiber collections of Table II. Again, as will be understood from the following, this set of test pieces included one or more preferred embodiments of the present invention and one or more comparison samples which were not embodiments of the present invention. From each of these test pieces was machined a wear test block sample, each of which will be hereinafter referred to by the reference symbol B0, B1, C0, C1, D0, and D1 of its parent preform since no confusion will arise therefrom.

Figure 9:
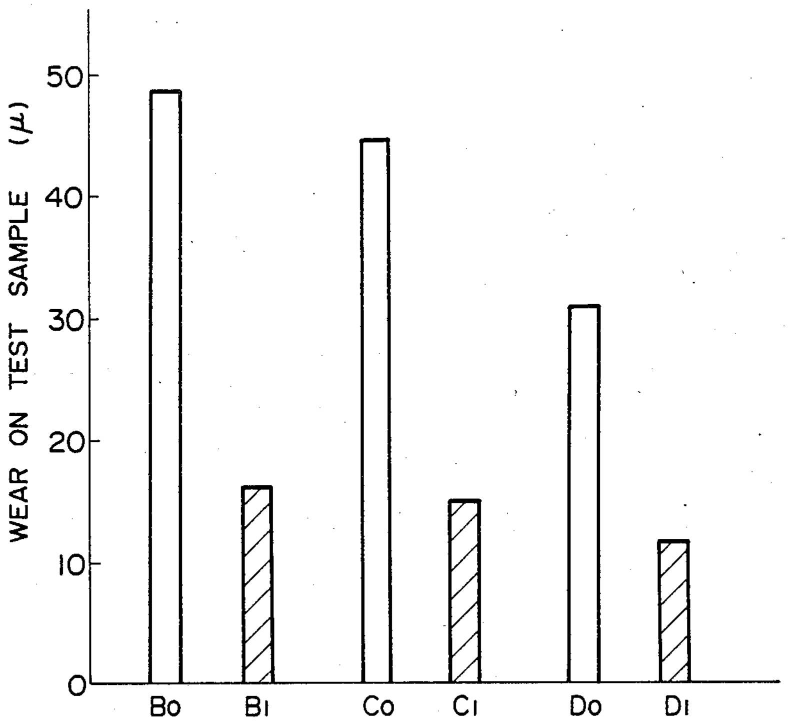
FIG. 9 is a bar chart in which, for each of six composite material wear test samples B0, B1, C0, C1, D0, and D1 including various amounts of the mullite crystalline form, there is shown the amount of wear on said composite material test sample in microns along the vertical axis.

Next, in turn, each of these wear test block samples B0, B1, C0, C1, D0, and D1 was mounted in a LFW friction wear test machine, and its test surface was brought into contact with the outer cylindrical surface of a mating element, which was a cylinder of bearing steel of type JIS (Japanese Industrial Standard) SUJ12, which had been quench tempered so that its hardness was equal to about Hv 710. Under substantially the same conditions as in the case of the first preferred embodiment described above, in each case a friction wear test was carried out. The results of these friction wear tests are shown in FIG. 9.

In this figure, which is a bar chart, for each of the wear test samples B0, B1, C0, C1, D0, and D1, there is shown the amount of wear on the composite material test sample in microns along the vertical axis. Now, from this FIG. 9 it will be understood that, irrespective of the chemical composition of the alumina—silica reinforcing fibers, when a substantial amount of the mullite crystalline form is included in said alumina—silica reinforcing fibers, then the wear amount of the test piece is very much improved over the case in which substantially none of the mullite crystalline form is included in the alumina—silica reinforcing fibers. Thus, it will be understood that, irrespective of the chemical composition of the alumina—silica reinforcing fibers, when a substantial amount of the mullite crystalline form is included in the alumina—silica reinforcing fibers, the wear resistance of the composite material including said alumina—silica reinforcing fibers is very much improved over the case in which substantially none of the mullite crystalline form is included in the alumina—silica reinforcing fibers.

TESTS RELATING TO THE THIRD PREFERRED EMBODIMENT VARIATION OF AMOUNT OF LARGE FIBROUS PARTICLES

A quantity of alumina—silica fiber material of the type described above with respect to the first preferred embodiment, with a quantity of non fibrous material intermingled therewith, was subjected to per se known particle elimination processing such as filtration or the like, so that the non fibrous particles initially intermingled therewith were largely eliminated, and so that the included weight of non fibrous particles with a diameter greater than or equal to 150 microns was about 0.3%. Next, to various samples of these alumina—silica fibers there were added various proportions of such non fibrous particles of diameter greater than or equal to 150 microns, so as to form five quantities of alumina—silica fibers designated as A6 through A10, of substantially the same chemical composition, but with varying amounts of such non fibrous partilces of diameter greater than or equal to 150 microns included therein, and with parameters as detailed in Table III, which is given at the end of this specification and before the claims thereof. Next, these five quantities A6 through A10 of alumina—silica fibers were subjected to heat processing in substantially the same way, so as to make the content of the mullite crystalline form included therein about 36% by weight in each case, as also detailed in Table III. Thus, as will be understood from this Table III, the five quantities of alumina—silica fibers A6 through A10 had widely differing amounts of non fibrous particles of diameter greater than or equal to 150 microns included in them, but their other parameters, i.e. their chemical composition, the content of the mullite crystalline form included in them, their average fiber diameter, and their average fiber length, were substantially the same, for all the fiber quantities A6 through A10.

Next, from each of these quantities of alumina—silica fibers A6 through A10 there was formed a corresponding preform, also designated by the like reference symbol A6 through A10, by the vacuum forming method, in substantially the same way as described above with regard to the first and second preferred embodiments, said preforms having dimensions of 80 by 80 by 20 millimeters, and as before the preforms were fired in a furnace at about 600° C. The fiber volume proportions for each of the five finished preforms A6 through A10 are also shown in Table III. And then a high pressure casting process was performed on each of the preforms A6 through A10, in substantially the same way as in the cases described above of the first and second preferred embodiments, again using aluminum alloy of type JIS (Japan Industrial Standard) AC8A as the matrix metal, said matrix metal being cast at a temperature of about 730° C. and at a pressure of about 1500 kg/cm$^2$ around and into the interstices of each of the preforms; and heat treatment of type T7 was applied to the cast forms, and from the parts of them in which the fiber performs were embedded were cut five test pieces of composite material incorporating alumina—silica fibers as the reinforcing fiber material and aluminum alloy as the matrix metal; thus, in all, again, five such test pieces were manufactured, each respectively corresponding to one of the preforms A6 through A10 made of one of the alumina—silica fiber collections of Table III. Again, as will be understood from the following, this set of test pieces included one or more preferred embodiments of the present invention and one or more comparison samples which were not embodiments of the present invention. From each of these test pieces were machined a machining test sample and a bending strength test sample, each of which will be hereinafter referred to by the reference symbol A6 through A10 of its parent preform since no confusion will arise therefrom.

Figure 10:
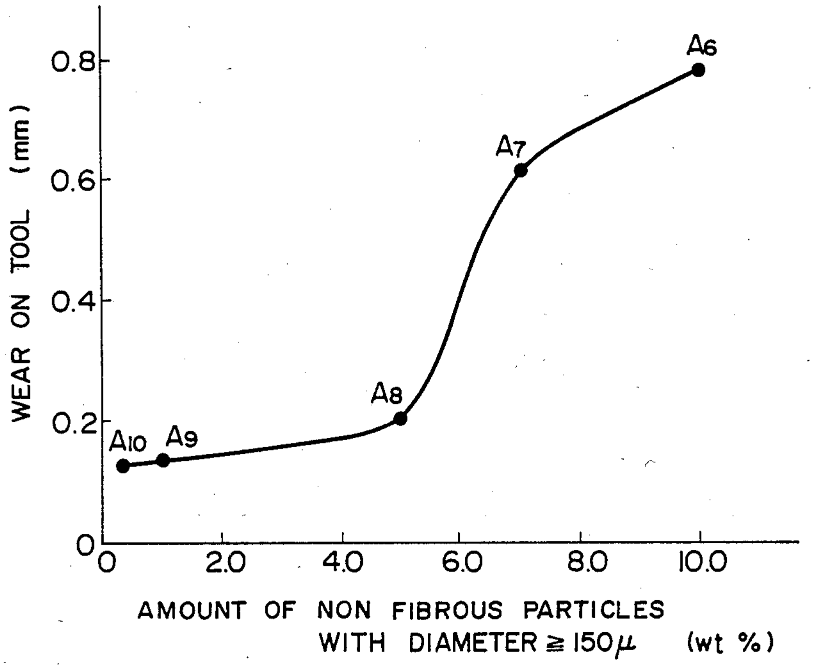
FIG. 10 is a graph relating to five test samples A6 through A10 with differing percentages by weight of non fibrous particles with diameter greater than or equal to 150 microns included therein, showing amount of wear during a machining test on a super hard tool along the vertical axis, and said amount of non fibrous particles of diameter greater than or equal to 150 microns in the test sample along the horizontal axis.

Each of the machining test samples A6 through A10 was then machined for a fixed time, using a super hard tool, at a cutting speed of 150 m/min, a feed rate of 0.03 millimeters per cycle, and using water as a coolant, and the amount of wear in millimeters on the super hard tool was measured in each case. The results of these measurements are shown in FIG. 10, which is a graph showing amount of wear on the super hard tool along the vertical axis and amount of non fibrous particles of diameter greater than or equal to 150 microns in the machining test sample along the horizontal axis, for each of the test samples A6 through A10. From the results of these measurements as shown in FIG. 10, it will be apparent that the two test pieces A10 and A9 of composite material, which were made using as reinforcing material the preforms A10 and A9 which contained relatively low amounts of non fibrous particles with diameter greater than or equal to 150 microns, had very good qualities with regard to wear on the tool, as compared with the other three test pieces A8 through A6 which contained more non fibrous particles with diameter greater than or equal to 150 microns; but the qualities of the test piece A8, which contained about 5% by weight of non fibrous particles with diameter greater than or equal to 150 microns, were marginal. Also it is seen that, the lower is the total amount of non fibrous particles of diameter greater than or equal to 150 microns intermingled with the alumina—silica fibrous reinforcing material for the composite material, the better is the characteristic with regard to wear on the machining tool. Accordingly, it is considered that, from the point of view of wear on a machining tool, it is desirable that the total amount of non fibrous particles of diameter greater than or equal to 150 microns intermingled with the alumina—silica fibrous reinforcing material for the composite material according to this invention should be less than or equal to about 5% by weight.

Figure 11:
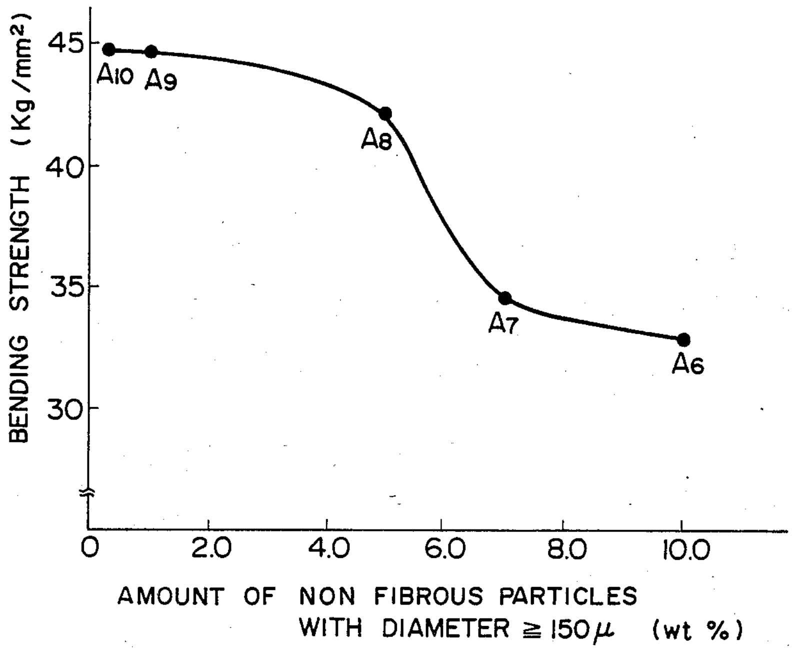
FIG. 11 is a graph, again relating to performance during a bending strength test of said five test samples A6 through A10, showing bending strength in kg/mm$^2$ along the vertical axis, and the weight percentage amount of non fibrous particles of diameter greater than to equal to 150 microns in the test sample along the horizontal axis.

Next, with regard to the bending strength test samples, each of these test samples A6 through A10 was subjected to a three point bending test as in the case of the first preferred embodiment as described above. The results of these bending strength tests are shown in FIG. 11, which is a graph showing bending strength for each of the five bending test samples A6 through A10, with the weight proportion in percent of non fibrous particles of diameter greater than or equal to 150 microns included in the alumina—silica fibers incorporated in said test samples being shown along the horizontal axis, and with the corresponding bending strength in kg/mm$^2$ being shown along the vertical axis. From this graph in FIG. 11, it will be apparent that when the weight proportion of the non fibrous particles of diameter greater than or equal to 150 microns included in the alumina—silica fibers was in the range from 0% to about 5%, then the bending strength of the test sample piece was relatively high, anbd particularly when the weight proportion of the non fibrous particles of diameter greater than or equal to 150 microns included in the alumina—silica fibers was in the range from 0% to about 3% then the bending strength of the test sample piece was substantially maximal; but as the weight proportion of the non fibrous particles of diameter greater than or equal to 150 microns included in the alumina—silica fibers rose above about 5%, the bending strength of the test samples dropped sharply. Accordingly, from these test results, it is considered that, from the point of view of bending strength of a part or finished member made of the composite material according to the present invention, it is desirable that the weight proportion of non fibrous particles of diameter greater than or equal to 150 microns included in the alumina—silica fiber material incorporated as fibrous reinforcing material for the composite material according to this invention should be less than or equal to about 5%, and in particular, in order to ensure substantially optimum such bending strength, said weight proportion preferably should be less than or equal to about 3%. As an overall conclusion, therefore, from these machining test results and these bendiang strength test results, it is considered that in order to ensure satisfactory machinability and strength for the composite material according to the present invention, it is desirable that the weight proportion of non fibrous particles of diameter greater than or equal to 150 microns included in the alumina—silica fiber material incorporated as fibrous reinforcing material for the composite material according to this invention should be less than or equal to about 5%; in particular, should be less than or equal to about 3%; and even more particularly should be less than or equal to about 1%.

TESTS RELATING TO THE FOURTH PREFERRED EMBODIMENT VARIATION OF FIBER VOLUME PROPORTION

A quantity of alumina—silica fiber material of chemical composition as shown in Table IV, which is given at the end of this specification and before the claims thereof, with a quantity of non fibrous material intermingled therewith, was subjected to particle elimination processing so that the non fibrous particles were largely eliminated, and so that the included weight of non fibrous particles with a diameter greater than or equal to 150 microns was about 0.1%. Next, this quantity of alumina—silica fibers was subjected to heat processing, so as to make the content of the mullite crystalline form included therein about 35% by weight, as also detaled in Table IV.

Next, from this quantity of alumina—silica fibers there were formed four preforms denoted as E1 through E4, each having dimensions of 80 by 80 by 20 millimeters, and as before the preforms were fired in a furnace at about 600° C. The preform E1 was formed by the vacuum forming method, in substantially the same way as described above with regard to the first and second preferred embodiments, said preform E1 having fiber volume proportion of 7.5%; the preforms E2 and E3 were formed by the vacuum forming method followed immediately by compression forming in a die, and had fiber volume proportions of 13% and 25% respectively, and the preform E4 was made by compression forming in a die with colloidal silica as a binder, and had fiber volume proportion of 34%. These fiber volume proportions for each of the four finished preforms E1 through E4 are also shown in Table IV. Thus, as will be understood from this Table IV, the four preforms E1 through E4 had widely differing fiber volume proportions, but their other parameters, i.e. their chemical composition, the content of the mullite crystalline form included in them, the proportion of non fibrous particles included in them of diameter greater than or equal to 150 microns, their average fiber diameter, and their average fiber length, were substantially the same, for all the four preforms E1 through E4. And then a high pressure casting process was performed on each of the preforms E1 through E4, in substantially the same way as in the case described above of the first preferred embodiment, this time using aluminum alloy of composition about 4.5% by weight Cu, about 0.4% by weight Mg, and balance A1 as the matrix metal, said matrix metal being cast at a temperature of about 740° C. and being forced at a pressure of about 1500 $kg/cm^2$ around and into the interstices of each of the preforms; however, in the case of the preforms E3 and E4, which had the highest fiber volume proportions, these preforms were preheated to a temperature of 600° C. before the high pressure casting process, in order to aid with the penetration of the molten aluminum alloy matrix metal into their interstices. Next, heat treatment of type T6 was applied to the cast forms, and from the parts of them in which the fiber preforms were embedded were cut four test pieces of composite material incorporating alumina—silica fibers as the reinforcing fiber material and aluminum alloy as the matrix metal; thus, in all, again, four such test pieces were manufactured, each respectively corresponding to one of the preforms E1 through E4 made of one of the alumina—silica fiber collections of Table IV. Again, as will be understood from the following, this set of test pieces included one or more preferred embodiments of the present invention and one or more comparison samples which were not embodiments of the present invention.

Next, from each of these test pieces was machined a tensile strength test sample, each of which will be hereinafter referred to by the reference symbol E1 through E4 of its parent preform. These tensile strength test samples each had an overall length of 52 millimeters and parallel portion diameter of 5 millimeters, with chuck portions at its end of length 10 millimeters and chuck diameter of 8 millimeters; the axes of these tensile strength test pieces were arranged to be parallel to the x-y plane as seen in FIG. 1. Further, a comparison tensile strength piece was made of the same dimensions, using only the aluminum alloy matrix metal (about 4.5% by weight Cu, about 0.4% by weight Mg, and balance A1) without any admixture of reinforcing alumina—silica fibers, and this comparison piece is designated as E0. These five tensile strength test pieces were each subjected to a tensile strength test, using a strain speed of 1 mm/min.

Figure 12:
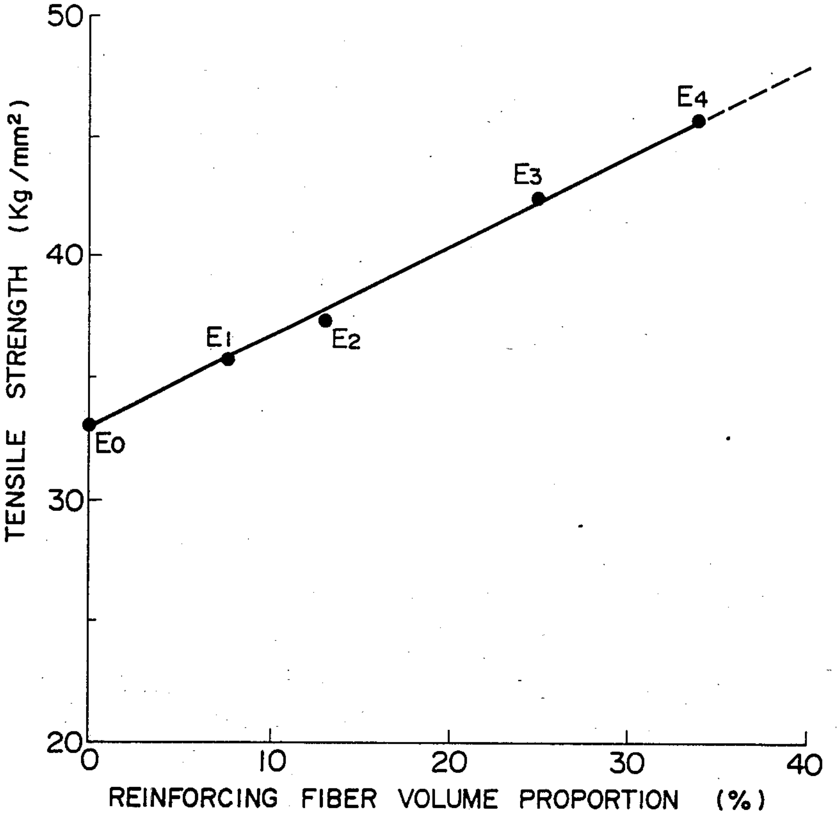
FIG. 12 is a graph relating to five tensile strength samples E0 through E4, in which tensile strength in kg/mm$^2$ is shown along the vertical axis and reinforcing fiber volume proportion of the samples in weight percent is shown along the horizontal axis.

The results of these tensile strength tests are shown in FIG. 12, which is a graph in which tensile strength in $kg/mm^2$ is shown along the vertical axis and reinforcing fiber volume proportion in weight percent is shown along the horizontal axis. From this figure, it can be seen that the higher is the volume proportion of the alumina—silica fibrous reinforcing material for the composite material, the more is the characteristic with regard to tensile strength improved from that of pure matrix metal only, in approximately a linear fashion. Accordingly, it is considered that, from the point of view of tensile strength, it is desirable that the volume proportion of the alumina—silica fibrous reinforcing material for the composite material should be high, in which case a tensile strength comparable with that of steel can be attained.

TESTS RELATING TO THE FIFTH PREFERRED EMBODIMENT LONG FIBER TEST

Figure 13:
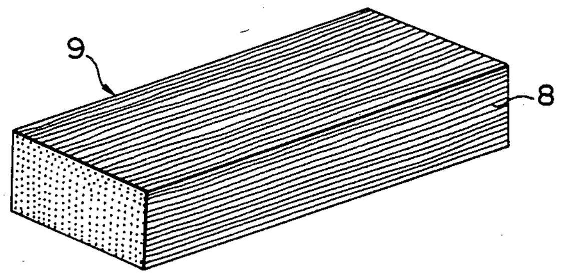
FIG. 13 is a perspective view of a fiber form made of long fiber alumina-silica material with substantially all of the fibers aligned in the longitudinal direction thereof.

A quantity of long fiber type alumina—silica fiber material of chemical composition approximately 49% by weight $Al_2O_3$ and approximately 51% by weight $SiO_2$, made by the blowing method, was subjected to heat processing, so as to make the content of the mullite crystalline form included therein about 44% by weight, and next a quantity of fibers with length 60 millimeters and greater was selected therefrom, and this bundle of alumina—silica fibers was subjected to particle elimination processing, so that the non fibrous particles therein were substantially completely eliminated. Then the bundle of alumina—silica fibers was cut to a length of 60 millimeters, and, while wet with distilled water, was compression formed in a die, all the fibers being aligned in one direction. The average fiber diameter of these long alumina—silica fibers was about 9.3 microns. This fiber bundle, while still in the die, was put into a freezer and was cooled down to about −30° C., and, after the distilled water which was permeating the fiber bundle had been frozen, the fiber bundle was taken from the die and shaped. In this manner, two fiber forms 8 were produced, as shown in perspective view in FIG. 13, with dimensions of about 60 millimeters by 20 millimeter by 10 millimeters, and with the alumina—silica fibers in them all aligned along their longitudinal directions. The fiber volume proportions of these fiber forms were 46% and 58%. Thus, these two fiber forms 9 had differing fiber volume proportions, but their other parameters, i.e. their chemical composition, the content of the mullite crystalline form included in them, the proportion of non fibrous particles included in them of diameter greater than or equal to 150 microns, their average fiber diameter, and their average fiber length, were substantially the same.

Next, each of these fiber forms was put into a case made of stainless steel about 1 millimeter thick, with internal dimensions of about 60 millimeters by 20 millimeters by 10 millimeters, and was heated in said case to a temperature of about 700° C., so that the water content in said fiber form was completely driven off by evaporation. And then a high pressure casting process was performed on each of the fiber forms, in substantially the same way as in the case described above with regard to the fourth preferred embodiment, again using aluminum alloy of composition about 4.5% by weight Cu, about 0.4% by weight Mg, and balance Al as the matrix metal, said matrix metal again being cast at a temperature of about 740° C. and being forced at a pressure of about 1500 $kg/cm^2$ around and into the interstices of each of the fiber forms. Next, after they had solidified and cooled, heat treatment of type T6 was applied to the cast forms, and from the parts of them into which the fiber forms were embedded were cut out two long fiber tensile strength test sample pieces of composite material incorporating alumina—silica fibers as the reinforcing fiber material and aluminum alloy as the matrix metal, with substantially the same dimensions as in the case of the fourth preferred embodiment described above, and with the reinforcing alumina—silica fibers all aligned in one direction.

These two test pieces were each subjected to a tensile strength test, using the same parameters as in the case of the fourth preferred embodiment discussed above. The results of these tensile strength tests were that the test pieces whose fiber preforms had had fiber volume proportions of 46% and 58% respectively had tensile strengths of 58 $kg/mm^2$ and 66 kg/m2. These values are about twice the tensile strength value of 33 $kg/mm^2$ obtained for the test piece of pure aluminum alloy (about 4.5% by weight Cu, about 0.4% by weight Mg, and balance Al) matrix metal without any reinforcing alumina—silica fibers, obtained in the tests done with respect to the fourth preferred embodiment, detailed in FIG. 12. Thus, from this pair of tests, it can be seen that, even when the alumina—silica reinforcing fibers with substantial proportion of the mullite crystalline phase are long fibers all aligned in the same direction, and particularly in the case (which is difficult to achieve if the reinforcing fibers are short fibers) that the fiber volume proportion is 40% or more, by using this alumina—silica fiber material containing the mullite crystalline phase as the fibrous reinforcing material for the composite material, the characteristic with regard to tensile strength is very much improved over that of pure matrix metal only.

TESTS RELATING TO THE SIXTH PREFERRED EMBODIMENT USE OF COPPER ALLOY AS MATRIX METAL AND FORMING BY POWDER METALLURGY

A quantity of long fiber type alumina—silica fiber material of chemical composition approximately 55% by weight $Al_2O_3$ and approximately 45% by weight $SiO_2$, with average fiber length about 20 millimeters, made by the blowing method, was subjected to particle elimination processing so that the amount of non fibrous particles therein was reduced to about 0.2%. Next, these fibers were subjected to heat processing, so as to make the content of the mullite crystalline form included therein about 62% by weight. Next, four samples of this fiber material were mixed in various proportions with copper alloy in powder form (this alloy was about 10% by weight Sn and balance Cu), so as to produce four mixture samples F1 through F4, as shown in Table V which is given at the end of this specification and before the claims thereof; and also one sample F0 of only powdered copper alloy of this type, with no admixture of reinforcing fibers, was produced. Each of the mixture samples was mixed with a small amount of ethanol, and was stirred up for about 30 minutes, so as to be well mixed up. Thus these five mixture samples F0 thrugh F4 had differing fiber volume proportions, but their other parameters, i.e. their chemical composition, the content of the mullite crystalline form included in them, the proportion of non fibrous particles included in them of diameter greater than or equal to 150 microns, their average fiber diameter, and their average fiber length, were substantially the same.

Next, each of these mixture samples was dried for about 5 minutes at a temperature of 80° C., and then a fixed amount thereof was packed into a die having cross sectional dimensions of about 15.02 millimeters by 6.52 milimeters and was formed into a sheet by the application of a pressure of about 4000 $kg/cm^2$ by the application of a punch. Next, each of these sheets was sintered in a batch sintering furnace in an atmosphere of decomposed ammonia gas (which had a dew point of about −30° C.) for about 30 minutes at a temperature of about 770° C., and was then left to cool in a cooling zone within the furnace, so as to produce a piece of composite material. And then wear test sample pieces of composite material incorporating alumina—silica fibers as the reinforcing fiber material and copper alloy as the matrix metal, with substantially the same dimensions as in the case of the fourth preferred embodiment described above, and with the reinforcing alumina—silica fibers all aligned in one direction, were produced. These wear test samples will as before be referred to by the reference symbols F0 thrugh F4 of their parent mixture samples.

Figure 14:
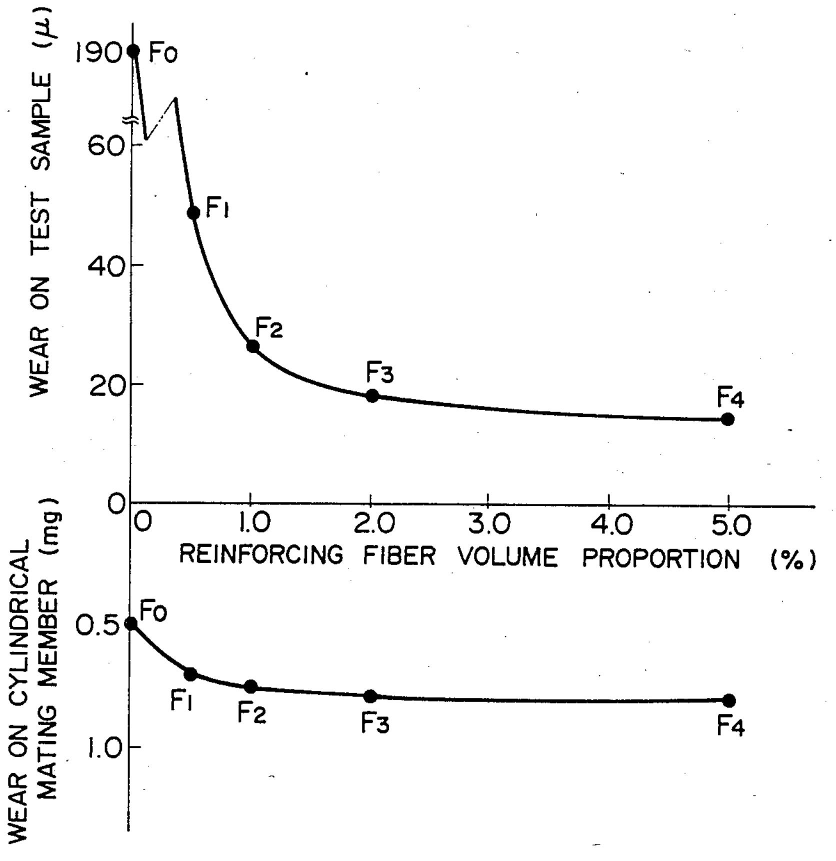
FIG. 14 is a two sided graph relating to wear tests of wear test samples F0 through F4, showing in its upper half along the vertical axis (which is broken away because of scale limitations) the amount of wear in microns on the actual test sample, and in its lower half along the vertical axis the amount of wear on the mating member (which is a bearing steel cylinder) in milligrams, and showing volume proportion in percent of the reinforcing alumina-silica fiber material incorporated in said test samples along the horizontal axis.

Next, in turn, each of these wear test samples F0 through F4 was mounted in a LFW friction wear test machine, and was tested in substantially the same way and under the same operational conditions as in the case of the first preferred embodiment described above, using as a mating element a cylinder of bearing steel of type JIS (Japanese Industrial Standard) SUJ2, with hardness Hv equal to about 710. The results of these frictional wear tests are shown in FIG. 14. In this figure which is a two sided graph, for each of the wear test samples F0 through F4, the upper half shows along the vertical axis (which is broken away because of scale limitations) the amount of wear on the actual test sample of composite material in microns, and the lower half shows along the vertical axis the amount of wear on the mating member (i.e. the bearing steel cylinder) in milligrams. And the volume proportion in percent of the reinforcing alumina—silica fiber material incorporated in said test samples is shown along the horizontal axis.

Now from this FIG. 14 it will be understood that, even when the volume proportion of the alumina—silica reinforcing fibers in the composite material is only about 0.5%, the amount of wear on the test piece drops very sharply, as compared to the case when no alumina—silica reinforcing fibers at all are included in the copper alloy matrix metal. And, as the volume proportion of the alumina—silica reinforcing fibers in the composite material rises above 0.5%, the amount of wear on the test piece further drops more. On the other hand, the wear amount of the mating member (the bearing steel cylinder) is not very substantially increased, when the volume proportion of the alumina—silica reinforcing fibers in the composite material is about 0.5%. Accordingly, from these test results, it is considered that, from the point of view of wear on a part or finished member made of the composite material according to the present invention, it is desirable that the volume proportion of the alumina—silica fiber material incorporated as fibrous reinforcing material for the composite material according to this invention should be greater than or equal to about 0.5%, and preferably should be greater than or equal to about 1.0%, and even more preferably should be greater than or equal to about 2.0%.

TESTS RELATING TO THE SEVENTH PREFERRED EMBODIMENT THE USE OF MAGNESIUM ALLOY AS MATRIX METAL

A quantity of alumina—silica fiber material with chemical composition about 55% by weight $Al_2O_3$ and about 45% by weight $SiO_2$, with a quantity of non fibrous material intermingled therewith, was subjected to particle elimination processing, so that the non fibrous particles therein were largely eliminated and so that the included weight of non fibrous particles with a diameter greater than or equal to 150 microns was reduced to about 0.1%. Next, a sample of this alumina—silica fiber material, which had average fiber diameter of about 2.5 microns and average fiber length of about 2.0 millimeters, was subjected to heat processing in substantially the same way as in the case of the first preferred embodiment detailed above, so as to make the content of the mullite crystalline form included therein about 62% by weight, and then from it there was formed a preform by the vacuum forming method, said preform having dimensions of 80 by 80 by 20 millimeters as before, and as before the preform was fired in a furnace at about 600° C. The fiber volume proportion for the preform was about 7.8%. And then a high pressure casting process was performed on the preform, in substantially the samd way as in the cases described above of the first and second preferred embodiments, but this time using magnesium alloy of type ASTM Standard AZ91 as the matrix metal, said matrix metal being cast at a temperature of about 690° C. and being pressurized at a pressure of about 1500 $kg/cm^2$ around and into the interstices of the preform. From the parts of the resulting cast mass in which the fiber preform was embedded was then machined a wear test sample of composite material incorporating alumina—silica fibers as the reinforcing fiber material and magnesium alloy as the matrix metal.

Then this wear test sample was tested in substantially the same way and under the same operational conditions as in the case of the first preferred embodiment described above, using as a mating element a cylinder of bearing steel of type JIS (Japanese Industrial Standard) SUJ2, with hardness Hv equal to about 710. The result of this wear test was that the amount of wear on the test sample of composite material was 25 microns, and accordingly the composite material was estimated to have very good wear resistance. Further, for comparison purposes, another wear test was also carried out using as test piece a block of the magnesium alloy (type ASTM Standard AZ91) only, with no reinforcing fiber material. In this case, however, after some minutes had passed, the test sample block was very much worn, and it became impossible for the test to be continued. As yet another comparison example, a piece of composite material was made by the same process as outlined above, except that no heat processing was performed thereon, so that it remained in the amorphous crystalline phase with crystals of the mullite crystalline form not separated out, and the same wear test was carried out on this sample of composite material. As a result, it was confirmed that the deterioration of the alumina—silica reinforcing fibers because of reaction between said fibers and the magnesium alloy matrix metal was very substantial, and the wear resistance of this comparison composite material was very much less than in the case of the seventh preferred embodiment of the present invention described above.

Accordingly, from these results, it is seen that alumina—silica fibers in which the mullite crystalline form has separated out are chemically stable, and there is no risk that due to chemical reaction with the matrix metal deterioration of the fibers should occur, even in the case that the matrix metal is a metal such as magnesium or its alloys which has a strong tendency to form oxides, and it is seen that even in this case such alumina—silica fibers fulfill satisfactorily the function of reinforcing fibers.

TESTS RELATING TO THE EIGHTH PREFERRED EMBODIMENT THE USE OF OTHER MATRIX METALS

In the same way and under the same conditions as in the case of the seventh preferred embodiment described above, a quantity of alumina—silica fiber material with chemical composition about 55% by weight $Al_2O_3$ and about 45% by weight $SiO_2$, with a quantity of non fibrous material intermingled therewith, was subjected to particle elimination processing, so that the non fibrous particles included therein were largely eliminated and so that the included weight of non fibrous particles with a diameter greater than or equal to 150 microns was reduced about 0.1%; and a sample of this alumina—silica material, which had average fiber diameter of about 2.5 microns and average fiber length of about 2.0 millimeters, was subjected to heat processing, so as to make the content of the mullite crystalling form included therein about 62% by weight, and then from it there were formed three preforms by the vacuum forming method, said preforms having dimensions of 80 by 80 by 20 millimeters as before, and as before the preforms were fired in a furnace at about 600° C. The fiber volume proportion for the preforms was about 7.8%. And then high pressure casting processes were performed on the preforms, in substantially the same way as in the case described above of the seventh preferred embodiment, but this time using a pressure of only about 500 kg/cm$^2$ as the casting pressure in each case, and respectively using as the matrix metal zinc alloy of type JIS (Japanese Industrial Standard) ZDC1, pure lead (of purity 99.8%), and tin alloy of type JIS (Japanese Industrial Standard) WJ2, which were respectively heated to casting temperatures of about 500° C., about 410° C., and about 330° C. From the parts of the resulting cast masses in which the fiber preforms were embedded were then machined wear test samples of composite material incorporating alumina—silica fibers as the reinforcing fiber material and, respectively, zinc alloy, pure lead, and tin alloy as the matrix metal.

Then these wear samples were tested in substantially the same way and under the same operational conditions as in the case of the first preferred embodiment described above (except that the contact pressure was 5 kg/mm$^2$), using as the mating element a cylinder of bearing steel of type JIS (Japanese Industrial Standard) SUJ2, with hardness Hv equal to about 710. The results of these friction wear tests were that the amounts of wear on the test samples of composite material were respectively 3%, 0.1%, and 2% of the wear amounts on test sample pieces made of only the corresponding matrix metal. Accordingly, it is concluded that by using this alumina—silica fiber material containing the mullite crystalline phase as the fibrous reinforcing material for the composite material, also in these cases of using zinc alloy, lead, or tin alloy as matrix metal, the characteristics of the composite material with regard to wear resistance are very much improved from those of pure matrix metal only.

Although the present invention has been shown and described with reference to these preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, when the alumina—silica fiber material containing the mullite crystalline phase used as the fibrous reinforcing material is a long fiber material, depending on the qualities required for the composite material to be produced, the orientation of the long alumina—silica fibers may be different from that shown in FIG. 13 with regard to the fifth preferred embodiment, in which the long fibers were all arranged in the same orientation. Therefore, it is desired that the scope of the present invention, and the protection sought to be granted by Letters Patent, should be defined not by any of the perhaps purely fortuitous details of the shown preferred embodiments, or of the drawings, but solely by the scope of the appended claims, which follow.

TABLE 1

| | Composite material | | | | | |
|---|---|---|---|---|---|---|
| Parameter | A0 | A1 | A2 | A3 | A4 | A5 |
| Reinforcing fibers | | | | | | |
| Amount of mullite crystalline form (wt %) | 0 | 11 | 15 | 19 | 35 | 65 |
| Fiber volume proportion (%) | 6.8 | 6.9 | 6.9 | 7.0 | 6.9 | 7.1 |
| Chemical composition (wt %) | $Al_2O_3$:51 $SiO_2$:49 | | | | | |
| Amount of particles 150 microns or more (wt %) | 0.3 | | | | | |
| Average fiber diameter (microns) | 2.9 | | | | | |
| Average fiber length (mm) | 1.7 | | | | | |
| Matrix metal: Aluminium alloy (JIS AC8A, T7 heat treatment) | | | | | | |

TABLE 2

| | | Composite material | | | | | |
|---|---|---|---|---|---|---|---|
| Parameter | | B0 | B1 | C0 | C1 | D0 | D1 |
| Reinforcing fibers | | | | | | | |
| Amount of mullite crystalline form (wt %) | | 0 | 28 | 0 | 31 | 0 | 84 |
| Chemical composition wt % | $Al_2O_3$ | 35.6 | | 46.6 | | 63.1 | |
| | $SiO_2$ | 64.2 | | 49.3 | | 36.9 | |
| | Others | $Fe_2O_3$:0.1 MgO:1.5 Remainder: $K_2O$:1.5 impurities CaO:1.1 | | | | | |
| Fibre volume proportion (%) | | 9.0 | | 8.8 | | 9.3 | |
| Average fiber diameter (microns) | | 4.7 | | 2.7 | | 1.8 | |
| Average fiber length (mm) | | 3.0 | | 1.9 | | 1.1 | |
| Amount of particles 150 microns or more (wt %) | | not more than 0.15 | | | | | |
| Matrix metal: Aluminium alloy (JIS AC8A, T7 heat treatment) | | | | | | | |

TABLE 3

| | Composite material | | | | |
|---|---|---|---|---|---|
| Parameter | A6 | A7 | A8 | A9 | A10 |
| Reinforcing fibers | | | | | |
| Amount of particles 150 microns or more (wt %) | 10 | 7.0 | 5.0 | 1.0 | 0.3 |
| Chemical composition wt % | $Al_2O_3$:51 $SiO_2$:49 | | | | |
| Amount of mullite crystalline form (wt %) | 36 | | | | |
| Average fiber diameter (microns) | 2.9 | | | | |
| Average fiber length (mm) | 1.5 | | | | |
| Fiber volume proportion (%) | 8.5 | | | | |
| Matrix metal: Aluminium alloy (JIS AC8A, T7 heat treatment) | | | | | |

TABLE 4

| | Composite material | | | |
|---|---|---|---|---|
| Parameter | E1 | E2 | E3 | E4 |
| Reinforcing fibers | | | | |
| Fibre volume proportion (%) | 7.5 | 13 | 25 | 34 |
| Chemical composition (wt %) | $Al_2O_3$:47 $SiO_2$:52 | | | |
| Amount of mullite crystalline form (wt %) | 36 | | | |
| Amount of particles 150 microns or more (wt %) | 0.1 | | | |
| Average fiber diameter (microns) | 2.7 | | | |
| Average fiber length (mm) | 3 | | | |

TABLE 4-continued

| Parameter | Composite material E1 | E2 | E3 | E4 |
|---|---|---|---|---|
| Matrix metal: Aluminium alloy* (T6 heat treatment) | | | | |

*Al—4.5 wt % Cu—0.4 wt % Mg

TABLE 5

| Parameter | Composite material F0 | F1 | F2 | F3 | F4 |
|---|---|---|---|---|---|
| Reinforcing fibers | | | | | |
| Fiber volume proportion (%) | 0 | 0.5 | 1.0 | 2.0 | 5.0 |
| Chemical composition (wt %) | | $Al_2O_3$:55 $SiO_2$:45 | | | |
| Amount of mullite crystalline form (wt %) | | | 62 | | |
| Amount of particles 150 microns or more (wt %) | | | 0.1 | | |
| Average fiber diameter (microns) | | | 2.5 | | |
| Average fiber length (microns) | | | 20 | | |
| Matrix metal: Copper alloy (Cu—10 wt % Sn) | | | | | |

What is claimed is:

1. A composite material, consisting essentially of:

(a) a reinforcing alumina—silica fiber material containing the mullite crystalline form with the principal components being about 35% to about 65% by weight of $SiO_2$, about 35% to about 65% by weight of $Al_2O_3$, and other substances in an amount of less than or equal to about 10% by weight, with the weight percentage of the mullite crystalline form therein being at least about 15%, and with the weight percentage of included non-fibrous particles with diameters greater than about 150 microns being not more than about 5%; and (b) a matrix metal selected from the group consisting of aluminum, magnesium, copper, zinc, lead, tin, and alloys having these metals as principal components; and wherein the volume proportion of said alumina—silica fibers is at least 0.5%.

2. The composite material according to claim 1, wherein the mullite crystalline amount in the alumina—silica fibers is at least 19%.

3. The composite material according to claim 1, wherein the weight percentage of the part of said non fibrous particles which have a diameter greater than or equal to 150 microns is not greater than about 1%.

4. The composite material according to claim 1, wherein said matrix metal is aluminum alloy.

5. The composite material according to claim 1, wherein said matrix metal is copper alloy.

6. The composite material according to claim 1, wherein said matrix metal is magnesium alloy.

7. The composite material according to claim 1, wherein said alumina—silica fibers are short fibers.

8. The composite material according to claim 1, wherein said alumina—silica fibers are long fibers.

9. The composite material according to claim 1, wherein said other substances present in said amount of less than or equal to about 10% by weight are selected from the group consisting of CaO, MgO, $Na_2O$, $Fe_2O_3$, $Cr_2O_3$, $ZrO_2$, $TiO_2$, PBO, $SnO_2$, ZnO, $MoO_3$, NiO, $K_2O$, $MnO_2$, $B_2O_3$, $V_2O_5$, CuO and $Co_3O_4$.

10. The composite material according to claim 1, wherein said alumina-silica fibers are short fibers having an average fiber diameter of approximately 1.5-5.0 microns and a fiber length of 20 microns to 3 mm.

11. The composite material according to claim 1, wherein said alumina-silica fibers are long fibers having an average fiber diameter of approximately 3-30 microns.

* * * * *